US009117319B2

(12) United States Patent
Chen et al.

(10) Patent No.: US 9,117,319 B2
(45) Date of Patent: Aug. 25, 2015

(54) HANDHELD AUTOMOTIVE DIAGNOSTIC TOOL WITH VIN DECODER AND COMMUNICATION SYSTEM

(75) Inventors: Ieon Chen, Laguna Hills, CA (US); Robert Madison, Lakewood, CA (US); Keith Andreasen, Garden Grove, CA (US); Phuong Pham, Fountain Valley, CA (US)

(73) Assignee: Innova Electronics, Inc., Irvine, CA (US)

( * ) Notice: Subject to any disclaimer, the term of this patent is extended or adjusted under 35 U.S.C. 154(b) by 1195 days.

(21) Appl. No.: 12/501,698

(22) Filed: Jul. 13, 2009

(65) Prior Publication Data

US 2009/0276115 A1 Nov. 5, 2009

Related U.S. Application Data

(63) Continuation-in-part of application No. 11/823,757, filed on Jun. 28, 2007, now Pat. No. 8,019,503, and a continuation-in-part of application No. 11/172,293, filed on Jun. 30, 2005, now Pat. No. 8,024,083, and a continuation-in-part of application No. 12/077,855, filed on Mar. 21, 2008, now Pat. No. 8,068,951.

(51) Int. Cl.
*G01M 17/00* (2006.01)
*G07C 5/00* (2006.01)
*G07C 5/08* (2006.01)

(52) U.S. Cl.
CPC .............. *G07C 5/008* (2013.01); *G07C 5/0808* (2013.01); *G07C 2205/02* (2013.01)

(58) Field of Classification Search
None
See application file for complete search history.

(56) References Cited

U.S. PATENT DOCUMENTS

| | | | | |
|---|---|---|---|---|
| 2,960,654 | A | 11/1960 | Nelson | |
| 3,646,438 | A | 2/1972 | Staff | |
| 4,112,748 | A | 9/1978 | Walley | |
| 4,176,315 | A | 11/1979 | Sunnarborg | |
| 4,207,611 | A | 6/1980 | Gordon | |
| 4,404,639 | A | 9/1983 | McGuire et al. | |
| 4,602,127 | A * | 7/1986 | Neely et al. | 379/68 |
| 4,684,896 | A | 8/1987 | Weishaupt | |
| 4,689,573 | A | 8/1987 | Hilmer | |
| 4,859,932 | A | 8/1989 | Whitley | |
| 4,884,033 | A | 11/1989 | McConchie, Sr. | |
| 5,003,478 | A | 3/1991 | Kobayashi et al. | |
| 5,005,129 | A | 4/1991 | Abe et al. | |
| 5,032,791 | A | 7/1991 | Bates, Jr. | |

(Continued)

*Primary Examiner* — Jonathan L Sample
(74) *Attorney, Agent, or Firm* — Stetina Brunda Garred & Brucker

(57) ABSTRACT

Provided is a method of receiving data from a vehicle onboard computer. The onboard computer is configured to transmit vehicle identification data in response to receipt of an identification request, which is transmitted in a basic communication protocol. The onboard computer is further configured to transmit private operational data in response to receipt of a private data request. The private data request is transmitted in a diagnostic protocol. The method includes connecting a scan tool to the onboard computer, and polling the onboard computer to identify the basic communication protocol. The identification request is then transmitted to the onboard computer. Vehicle identification data is subsequently received from the onboard computer. A protocol database having a plurality of diagnostic protocols is then accessed. Each diagnostic protocol is associated with respective vehicle identification data. The diagnostic protocol is then determined based on the received vehicle identification data.

41 Claims, 9 Drawing Sheets

(56) References Cited

U.S. PATENT DOCUMENTS 5,107,428 A 4/1992 Bethencourt et al.
5,157,708 A 10/1992 Garthwaite et al.
5,170,125 A 12/1992 Bates, Jr.
5,214,582 A 5/1993 Gray
5,247,245 A 9/1993 Nelson
5,278,508 A 1/1994 Bowman
5,285,163 A 2/1994 Liotta
5,345,384 A * 9/1994 Przybyla et al. ............. 701/29.1
5,359,290 A 10/1994 Cervas
5,394,093 A 2/1995 Cervas
5,400,018 A 3/1995 Scholl et al.
5,481,906 A 1/1996 Nagayoshi et al.
5,491,418 A 2/1996 Alfaro et al.
5,506,772 A 4/1996 Kubozono et al.
5,519,397 A 5/1996 Chapotot et al.
5,532,927 A 7/1996 Pink et al.
5,541,840 A 7/1996 Gurne et al.
5,631,831 A * 5/1997 Bird et al. .................... 701/34.4
5,635,841 A 6/1997 Taylor
5,657,233 A 8/1997 Cherrington et al.
5,758,300 A 5/1998 Abe
5,875,413 A 2/1999 Vinci
5,884,202 A * 3/1999 Arjomand .................... 701/31.4
5,916,286 A 6/1999 Seashore et al.
5,935,180 A * 8/1999 Fieramosca et al. ......... 701/29.6
6,021,366 A 2/2000 Fieramosca et al.
6,061,638 A 5/2000 Joyce
6,097,998 A 8/2000 Lancki
6,141,608 A * 10/2000 Rother ......................... 701/29.6
6,225,898 B1 * 5/2001 Kamiya et al. ................ 340/505
6,263,265 B1 7/2001 Fera
6,263,268 B1 * 7/2001 Nathanson ................... 701/31.5
6,263,322 B1 * 7/2001 Kirkevold et al. ............ 705/400
6,295,492 B1 9/2001 Lang et al.
6,314,422 B1 11/2001 Barker et al.
6,330,499 B1 12/2001 Chou et al.
6,359,442 B1 3/2002 Henningson et al.
6,370,454 B1 4/2002 Moore
6,389,337 B1 * 5/2002 Kolls ........................... 701/31.6
6,434,455 B1 8/2002 Snow et al.
6,459,969 B1 10/2002 Bates et al.
6,473,659 B1 * 10/2002 Shah et al. ...................... 700/79
6,535,802 B1 3/2003 Kramer
6,594,579 B1 7/2003 Lowrey et al.
6,604,033 B1 8/2003 Banet et al.
6,611,740 B2 8/2003 Lowrey et al.
6,636,790 B1 * 10/2003 Lightner et al. ............. 701/31.5
6,680,675 B1 1/2004 Suzuki
6,687,584 B2 2/2004 Andreasen
6,701,233 B2 3/2004 Namaky et al.
6,718,425 B1 4/2004 Pajakowski et al.
6,732,031 B1 * 5/2004 Lightner et al. ............. 701/31.4
6,738,696 B2 5/2004 Oi
6,771,073 B2 8/2004 Henningson et al.
6,807,469 B2 10/2004 Funkhouser et al.
6,823,243 B2 11/2004 Chinnadurai et al.
6,832,141 B2 12/2004 Skeen et al.
6,836,708 B2 * 12/2004 Tripathi ....................... 701/33.4
6,845,307 B2 1/2005 Rother
6,928,349 B1 8/2005 Namaky et al.
6,940,270 B2 9/2005 Chen
6,941,203 B2 9/2005 Chen
6,947,816 B2 9/2005 Chen
6,957,133 B1 * 10/2005 Hunt et al. ................... 701/32.4
7,012,512 B2 3/2006 St. Denis
7,073,714 B2 7/2006 Namaky et al.
7,085,680 B2 8/2006 Huang
7,209,860 B2 * 4/2007 Trsar et al. .................... 702/183
7,409,317 B2 * 8/2008 Cousin et al. ................. 702/183
7,590,476 B2 * 9/2009 Shumate ...................... 701/31.6
7,620,484 B1 * 11/2009 Chen ............................ 701/31.5
7,684,908 B1 * 3/2010 Ogilvie et al. ............... 701/29.6
8,019,503 B2 * 9/2011 Andreasen et al. .......... 701/29.6
8,024,083 B2 * 9/2011 Chenn .......................... 701/31.5
8,065,048 B2 * 11/2011 Bertosa et al. ............... 701/32.7
8,239,094 B2 * 8/2012 Underdal et al. ............ 701/29.4
8,677,019 B2 * 3/2014 Bruenner et al. ............. 709/245
2001/0053983 A1 12/2001 Reichwein et al.
2002/0007237 A1 * 1/2002 Phung et al. .................... 701/33
2002/0016655 A1 2/2002 Joao
2002/0128985 A1 * 9/2002 Greenwald ................... 705/400
2002/0156692 A1 10/2002 Squeglia et al.
2002/0193925 A1 12/2002 Funkhouser et al.
2003/0060953 A1 * 3/2003 Chen ............................... 701/33
2003/0171111 A1 * 9/2003 Clark ......................... 455/414.1
2003/0177417 A1 * 9/2003 Malhotra et al. ................ 714/42
2004/0044454 A1 * 3/2004 Ross et al. ....................... 701/33
2004/0064225 A1 * 4/2004 Jammu et al. ................... 701/29
2004/0088087 A1 * 5/2004 Fukushima et al. ............ 701/32
2004/0093155 A1 * 5/2004 Simonds et al. .............. 701/200
2004/0153362 A1 * 8/2004 Bauer et al. ..................... 705/10
2004/0172177 A1 * 9/2004 Nagai et al. ..................... 701/29
2004/0227523 A1 * 11/2004 Namaky ........................ 324/537
2004/0249557 A1 * 12/2004 Harrington et al. ........... 701/115
2005/0021294 A1 * 1/2005 Trsar et al. .................... 702/183
2005/0060070 A1 * 3/2005 Kapolka et al. ................. 701/29
2005/0143882 A1 * 6/2005 Umezawa ....................... 701/29
2006/0041348 A1 2/2006 Liebl et al.
2006/0041349 A1 2/2006 Chinnadurai et al.
2006/0095230 A1 * 5/2006 Grier et al. .................... 702/183
2006/0149434 A1 * 7/2006 Bertosa et al. .................. 701/29
2006/0161313 A1 * 7/2006 Rogers et al. ...................... 701/1
2006/0161390 A1 * 7/2006 Namaky et al. ............... 702/183
2007/0152503 A1 * 7/2007 Kowalick ..................... 307/10.1
2007/0250228 A1 * 10/2007 Reddy et al. .................... 701/29
2008/0045274 A1 * 2/2008 Witkowski et al. ........ 455/569.2
2008/0071439 A1 * 3/2008 Bertosa et al. .................. 701/29
2008/0133432 A1 * 6/2008 Ramseyer ..................... 705/400
2008/0140281 A1 * 6/2008 Morris et al. ................... 701/33
2008/0195271 A1 * 8/2008 Bertosa et al. .................. 701/29
2009/0006476 A1 * 1/2009 Andreasen et al. ........ 707/104.1
2009/0276115 A1 * 11/2009 Chen ............................... 701/32
2010/0185356 A1 * 7/2010 Haas et al. ...................... 701/33

* cited by examiner

HANDHELD AUTOMOTIVE DIAGNOSTIC TOOL WITH VIN DECODER AND COMMUNICATION SYSTEM

CROSS-REFERENCE TO RELATED APPLICATIONS

This application is a continuation-in-part of prior application Ser. No. 11/823,757, entitled Automotive Diagnostic and Remedial Process, filed Jun. 28, 2007, a continuation-in-part of prior application Ser. No. 11/172,293 entitled Cell phone Based Vehicle Diagnostic System, filed Jun. 30, 2005, now U.S. Pat. No. 8,024,083, and a continuation-in-part of prior application Ser. No. 12/077,855, entitled Vehicle Diagnostic System, filed Mar. 21, 2008, now U.S. Pat. No. 8,068,951 the disclosures of which are incorporated herein by reference.

STATEMENT RE: FEDERALLY SPONSORED RESEARCH/DEVELOPMENT (Not Applicable)

BACKGROUND OF THE INVENTION

1. Field of the Invention

The present invention relates generally to a vehicle diagnosis method, and more specifically to a method of reconfiguring an automotive diagnostic tool based on a vehicle's VIN to receive diagnostic data and relay diagnostic data to a remote server via a user's cell phone.

2. Description of the Related Art

Over time, vehicles have evolved from a generally mechanical device, to a complex electro-mechanical system having a wide-range of computer components integrated into the vehicle. For instance, the components may sense and store operational data (i.e., emissions data, mileage per gallon data, engine temperature data, etc.) on a central onboard computer. Such data may be useful for purposes of diagnosing potential problems with the vehicle. Therefore, there may be a significant desire to access such data.

Accessing such data may require communication with the onboard computer. Given that vehicles are manufactured by a number of different manufacturers, the protocol or computer language used by onboard computers may vary from vehicle to vehicle. However, certain government regulations may require automakers to provide access to certain data stored on an onboard computer. For instance, most, if not all onboard computers on vehicles subject to the government regulation must generally communicate in a basic, standardized protocol to provide certain vehicle data, such as emissions and mileage per gallon.

Other data located on the onboard computer may not be subject to such government regulation. Moreover, onboard computers may use a different protocol for access to data not subject to government regulation. The protocol may vary by the vehicle's manufacturer, make, model, year, etc. Therefore, in order to determine the specific protocol to access certain data in a given onboard computer, it may be necessary to know the manufacturer, make, model, year, etc. for that vehicle.

Many prior art devices are capable of communicating with an onboard computer using the specific protocol of the onboard computer. However, in order to determine the proper protocol to access certain types of data, the prior art devices may require the user to enter the year, manufacturer, make, model, or related information into the device. In this regard, the device may include a user interface having a user menu which the user navigates to enter the vehicle-specific information. For instance, the user menu may include a series of fields which the user may enter the vehicle-specific information into. Furthermore, the user menu may include a number of drop-down menus allowing the user to select the option corresponding to the particular vehicle. In either case, the user is required to navigate through a user menu and input vehicle-specific data. Such a process may take several minutes to complete, during which time a user may lose patience or be drawn to another task. Furthermore, a user may not know all of the information required to access a specific protocol.

In addition to the foregoing, many communication systems have also been developed to communicate diagnostic data from a vehicle for diagnostic analysis. For instance, the increasing sophistication of vehicle diagnostic systems has given rise to a variety of communication systems for interfacing the vehicle diagnostic system to wireless networks, for routing vehicle owners to service providers, the internet and elsewhere. Business models for various automatic systems have emerged, based on different commercial approaches for interfacing communication networks to vehicle voice and data systems. Typically, the communications systems include a wireless appliance installed in the vehicle, wired to the vehicle diagnostic system. The wireless appliance may include, or be wired to a global position satellite (GPS) system, for generating information respecting the location of the vehicle. The wireless appliance may communicate with a dedicated receiver, and charge a subscription fee to maintain and support the data link.

A common shortcoming of such contemporary systems is that they typically require dedicated hardware, e.g. a wireless appliance mounted to a vehicle, and electrically connected to the vehicle computer. The hardware generally relies upon a dedicated wireless communication link to a specific service provider. Consequently, the user may feel captive to a particular diagnostic subscription service. Such systems may be viewed as expensive, of limited functionality, and tend to be standard equipment only in higher priced vehicles.

In relation to conventional prior art systems, it would be desirable to provide a diagnostic communication system that does not require mounting to a vehicle chassis, or need installation by a trained installer. It is desirable to provide a diagnostic communication system that does not require a dedicated communications link, but rather allows a user to connect to a variety of generally available contacts on the cellular network, public telephone network and the internet, without the need for participation in a subscription communication service.

As described below, the present invention, in different combination embodiments, addresses these and other improvements to contemporary vehicle diagnostic communication systems, and business methods related thereto.

BRIEF SUMMARY OF THE INVENTION

The invention provides a device and method for quickly and easily determining the protocol or communication language used by an onboard vehicle computer. It is understood that an onboard computer may communicate high-level diagnostic data in a protocol that is specific or private to the particular vehicle associated with the onboard computer. Accordingly, one aspect of the method and device disclosed herein, is directed toward decoding a vehicle identification number (VIN) to access a diagnostic protocol for communicating with an onboard computer.

The invention provides a method of receiving data from an onboard computer located on a vehicle. The method includes connecting a scan tool to the onboard computer and polling the onboard computer to identify a basic communication protocol. In one embodiment, an identification request is then transmitted to the onboard computer in the basic communication protocol. The onboard computer is configured to communicate vehicle identification data upon receipt of the identification request. In another embodiment, vehicle identification data is optically scanned, e.g. by a barcode scanner, from identification data located on the vehicle. Once, the vehicle identification data is received, e.g. from the onboard computer or scanned, a protocol database may be accessed which includes one or more diagnostic protocols. In some cases, the diagnostic protocols are addressable by one or more portions of the received vehicle identification data. The diagnostic protocol corresponding to such received vehicle identification data may then be accessed and used to re-configure the scan tool to communicate with the onboard computer to recover associated data from the vehicle. Once the diagnostic data is received, it may be transmitted from the scan tool to a cell phone via a local connectivity circuit. The data is then transmitted from the cell phone to a main server via a cellular telephone network. The main server may include a diagnostic database being arranged to map vehicle diagnostic data to a possible vehicle fix(es). A bid is then solicited from a repair shop to perform the possible vehicle fix. The bid is subsequently communicated to the cell phone via the cellular telephone network.

The vehicle identification data may include the vehicle identification number (VIN) associated with the particular vehicle. The diagnostic protocol may be associated with one or more vehicle characteristics. For instance, the diagnostic protocol may be associated with the manufacturer of the vehicle, and/or the year of the vehicle. Accordingly, the VIN may be decoded to determine the particular vehicle characteristic (i.e. manufacturer, vehicle year) associated with a diagnostic protocol.

In other cases, the diagnostic protocol(s) are available only under license agreement with the vehicle/equipment manufacturer. Without such a license, the data and/or control functions accessible under that protocol(s) is unavailable to the mechanic. Upon receipt of such a license, the licensed protocol, or an identifier allowing access to the licensed protocol or data may be loaded into the scan tool for enhanced access to vehicle data and/or vehicle control functions in diagnosing and repairing the associated vehicle(s). The licensed protocols or identifier may also be addressable by vehicle identification data, or portions thereof. Alternatively, the licensed protocol or identifier can be appended to the data from the scan tool for recognition and response by the vehicle on board computer, once a diagnostic protocol is derived from vehicle identification data.

The method may further include the step of prioritizing the possible vehicle fix(es) in accordance with ranked matches of the received private operational data to combinations of private operational data stored in a prior experience database. The prior experience database may include an identified fix associated with stored combinations of private operational data. The fix associated with the highest ranked combination of private operational data may be identified as the most likely fix. The most likely fix may be mapped to a vehicle repair procedure database with the most likely fix being directly mapped to an associated repair procedure for repairing the most likely fix.

There may also be provided a method of receiving data from an onboard computer wherein a handheld automotive diagnostic device and a cable is provided. The diagnostic device may include an input/output connector, and the cable may include a first connector and a second connector. The cable may have a unique physical feature correlated to a specific basic communication protocol. The first connector may be connected to the input/output connector on the diagnostic device. A basic communication protocol signal from the cable may be received, including cable identification data unique to the physical features of the cable. The retrieved cable identification data may be compared with at least one look-up cable to identify the basic communication protocol. Once the basic communication protocol is determined, an identification request may be transmitted to the onboard computer in the basic communication protocol. Subsequently, vehicle identification data may be received from the onboard computer, and a protocol database having a plurality of diagnostic protocols may be accessed to determine the diagnostic protocol based on the received vehicle identification data.

The present invention is best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings in which like numbers refer to like parts throughout and in which.

DETAILED DESCRIPTION OF THE INVENTION

Various aspects of the present invention are directed toward a vehicle diagnostic system which facilitates retrieval of diagnostic data from a vehicle and communicates the diagnostic data to a remote diagnostic server via a user's cell phone. More specifically, the vehicle diagnostic system includes a handheld automotive diagnostic tool configured to retrieve a vehicle's vehicle identification number (VIN). The automotive diagnostic tool determines the communication protocol(s) of the vehicle's onboard computer based on the vehicle identification number and reconfigures itself to communicate with the onboard computer in the appropriate communication protocols. Once diagnostic data is received from the vehicle, the automotive diagnostic tool transmits the diagnostic data to a user's cell phone via a first stage, local connectivity circuit. The cell phone subsequently transmits the data to a remote database for diagnostic analysis.

Figure 1:
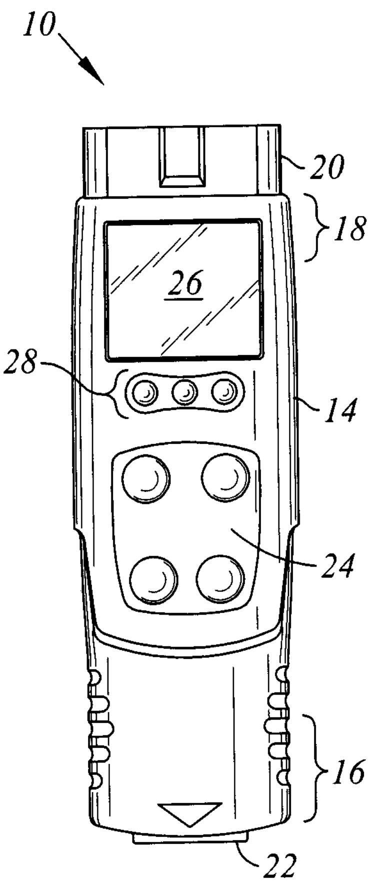
FIG. 1 is a front view of a handheld automotive diagnostic tool.
Figure 2:
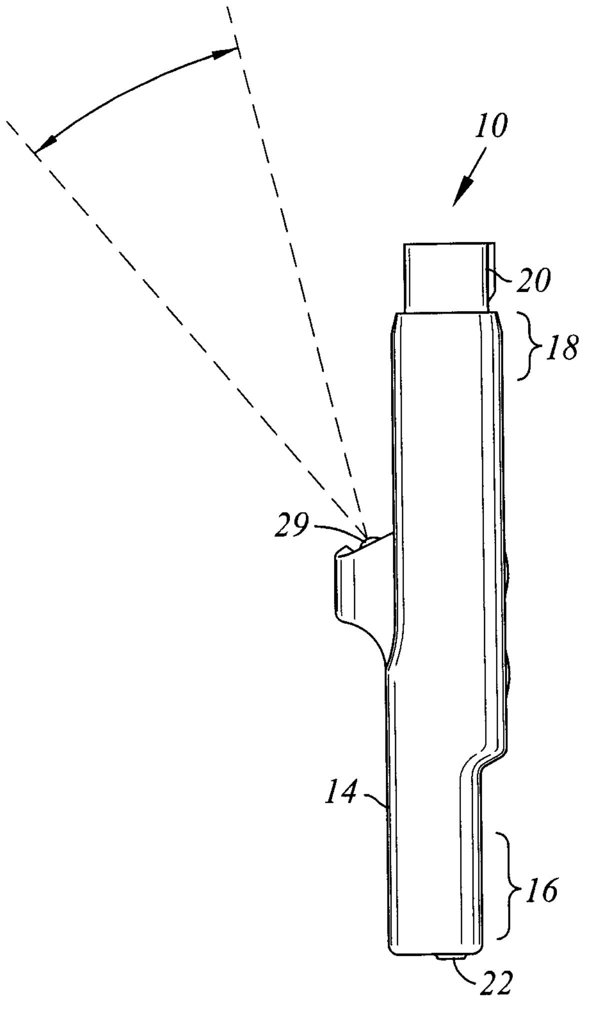
FIG. 2 is a side view of the handheld automotive diagnostic tool illustrated in FIG. 1, the automotive diagnostic tool including a barcode scanner.
Figure 3:
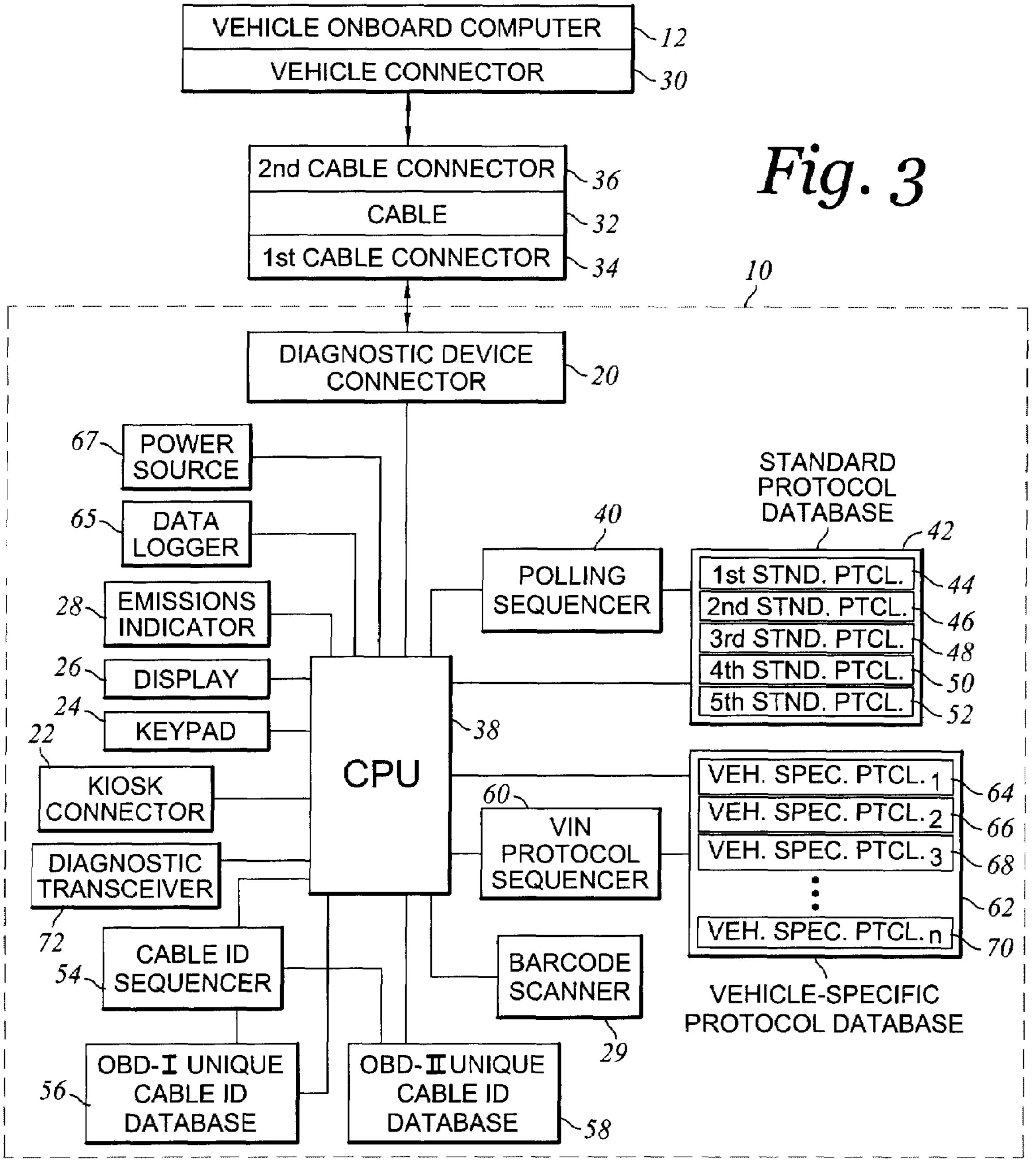
FIG. 3 is a schematic view of the automotive diagnostic tool.

Referring now to the drawings, wherein the showings are for purposes of illustrating a preferred embodiment of the present invention only, and not for purposes of limiting the same, FIGS. 1-3 depict one embodiment of a hand held automotive diagnostic tool 10. The diagnostic tool 10 is configured to connect to a vehicle to communicate with an onboard vehicle computer 12 (see FIG. 3) to receive data relating to the operation of the vehicle. The diagnostic tool 10 may be a universal diagnostic device compatible with both OBD-I and OBD-II standards by adapting to support various communication protocols employed by various vehicles. The various protocol(s) employed by a vehicle may be determined by the diagnostic tool 10 by decoding the vehicle identification number (VIN). The diagnostic tool 10 may obtain the VIN from the vehicle with minimal or no input by a user. Accordingly, the user may not be required to separately input the VIN or navigate through a user menu, which may be a long and tedious process. Therefore, the automotive diagnostic tool 10 may communicate with an onboard vehicle computer 12 in a quicker and more efficient manner.

Referring now specifically to FIG. 1, one embodiment of the diagnostic tool 10 includes an easy-to-use, hand held device. The diagnostic tool 10 includes a housing 14 defining a proximal end portion 16 and a distal end portion 18. The proximal end portion 16 may be grippable by a user when using the diagnostic tool 10. The diagnostic tool 10 may also include a diagnostic connector 20 extending outwardly from the distal end portion 18 of the housing 16. The diagnostic connector 20 facilitates communication between the diagnostic tool 10 and the onboard computer 12. The tool 10 may additionally include a kiosk connector 22 at the proximal end portion 16 for communication with a diagnostic kiosk or console.

The diagnostic tool 10 may also include a key pad 24 to allow a user to operate the diagnostic tool 10. For instance, the key pad 24 may allow a user to turn the tool 10 on or off, erase data previously stored on the tool 10, or to initiate communication with the onboard computer 12.

A display 26 may also be included on the diagnostic tool 10 to display data received from the vehicle. Diagnostic indicators 28 may further be included on the diagnostic tool 10 to quickly and easily communicate a diagnostic condition to a user. For instance, the diagnostic tool 10 illustrated in FIGS. 1 and 2 includes three lights (i.e., red, yellow, and green) to indicate whether a vehicle would pass an emissions test. Upon receiving emissions data from a vehicle, one of the lights in the diagnostic indicator 28 would illuminate. If the red light illuminates, the vehicle would likely fail an emissions test. If the green light illuminates, the vehicle would likely pass an emissions test. If the yellow light illuminates, it may be unclear as to whether the vehicle would pass or fail the emissions test. Although the foregoing describes the diagnostic indicator 28 in the context of an emissions test, it is understood that the diagnostic indicator 28 is not limited thereto.

Referring to FIG. 2, the diagnostic tool 10 may include a barcode scanner 29 for scanning a barcode or other scannable data located on a vehicle to obtain vehicle information therefrom. This may be particularly useful in OBD-I compliant vehicles to obtain the VIN from the barcode, as discussed in more detail below.

Architecture of the Vehicle Diagnostic Tool

Referring now to FIG. 3, there is shown an exemplary system architecture of one embodiment of the diagnostic tool 10 configured to communicate with the vehicle onboard computer 12. The diagnostic tool 10 communicates with the onboard computer 12 via a vehicle connector 30 located on the vehicle. More specifically, the diagnostic connector 20 on the diagnostic tool 10 is operatively communicable with the vehicle connector 30. The vehicle connector 30 may be configured to communicate with the diagnostic connector 20 via a wired or wireless connection. Such wireless communication may be achieved through BLUETOOTH® communication, RF communication, infrared communication, or other wireless communication means known by those skilled in the art.

It is contemplated that the vehicle connector 30 may be a standard outlet or connector located on the vehicle (as may be the case in OBD-II compliant vehicles), in which case, the diagnostic connector 20 may directly engage with the vehicle connector 30. For vehicles which do not include a standard connector, an adaptor may be used to connect the diagnostic connector 20 to the vehicle connector 30. For instance, the adaptor may include a cable 32 having a first cable connector 34 engageable with the diagnostic connector 20, and a second cable connector 36 engageable with the vehicle connector 30.

Once the diagnostic tool 10 is operatively connected to the onboard computer 12, the diagnostic tool 10 may begin sending initiation signals to the onboard computer 12. However, in order to achieve successful communication between the tool 10 and the computer 12, the computer 12 generally requires that the signals are in a protocol understandable by the computer 12. Therefore, the particular protocol used by the onboard computer 12 may be identified to facilitate communication with the tool 12. Accordingly, one embodiment of the diagnostic tool 10 includes a polling sequencer 40 for transmitting a protocol identification request (e.g. initiation signal) to the computer 12 in different protocols.

The polling sequencer 40 is in communication with a central CPU 38, which controls operation of the tool 10. It is understood that in many vehicles, especially OBD-II compliant vehicles, the onboard computer 12 may employ one of only a handful of standardized, basic communication protocols with regard to certain basic communications. Accordingly, in order to determine which basic communication protocol is employed by a particular onboard computer 12, the polling sequencer 40 communicates the initiation or identification signal in one of the basic communication protocols. If the onboard computer 12 transmits a confirmation signal (which may include general vehicle identification data) in response to the initiation signal transmitted by the polling sequencer 40, the correct basic communication protocol has been used by the polling sequencer 40. Conversely, if the onboard computer 12 does not transmit a confirmation signal, the polling sequencer 40 transmits an initiation signal in another basic communication protocol until the correct basic communication protocol is determined.

The polling sequencer 40 is in communication with a basic communication protocol database 42 having initiation signals in the various basic communication protocols. As shown in FIG. 3, the basic communication protocol database 42 includes initiation signals in a first basic communication protocol 44, a second basic communication protocol 46, a third basic communication protocol 48, a fourth basic communication protocol 50, and a fifth basic communication protocol 52. Although the basic communication protocol database 42 illustrated in FIG. 3 includes five basic communication protocols, it is understood that the basic communication protocol database 42 may include initiation signals in any number of basic communication protocols, without departing from the spirit and scope of the present invention.

Once communication between the tool 10 and the computer 12 has been established, and the basic communication protocol has been determined, the tool 10 may transmit a request to the computer 12 for the vehicle's VIN. For OBD-II compliant vehicles (i.e., vehicles manufactured after 1996), the VIN number may be communicated from the onboard computer 12 to the diagnostic tool 10 using the polling procedure described above. Once the VIN number is obtained, the higher level protocols employed by the particular onboard computer 12 may be determined, as described in more detail below.

However, for pre-OBD-II vehicles (i.e., OBD-I vehicles) the onboard computer 12 may not be configured to communicate the VIN to the tool 10. Therefore, an alternate method of obtaining the VIN is to retrieve the VIN from a bar code located on the vehicle. Most vehicles include multiple bar codes having VIN information coded therein. The bar codes may be located in various locations through the vehicle. One common location is inside the vehicle door. Therefore, one embodiment of the diagnostic tool 10 includes a bar code scanner 30 (see FIG. 2) for scanning the bar code to obtain the VIN number. Again, once the VIN is obtained, the higher level protocols employed by the vehicle computer 12 may be obtained by decoding the VIN.

In the case of onboard computers 12 which do not employ one of the basic communication protocols, as discussed above, the initiation protocol used by some onboard computers 12 may be unique to the physical features of the vehicle connector 30 used by the onboard computer 12. Therefore, an alternative method of obtaining the initial, basic communication protocol is to match the unique connector (or the adapter used to interface the tool 10 with the connector, such as a cable 32) to a basic communication protocol.

One embodiment of the diagnostic tool 10 includes a cable ID sequencer 54 for determining the basic communication protocol used by the onboard computer 12 based on the second cable connector 36. Cable identification data may be retrieved from the cable 32 upon connection to the diagnostic tool 10. The cable identification data may be indicative of the cable's second cable connector 36. The cable identification data may be compared to an OBD-I unique cable ID database 56, which contains information on each type of vehicle connector 30 utilized with OBD-I protocols for each specific manufacturer. Likewise, if the vehicle connector 30 is on OBD-II compliant vehicle, the cable identification data may be compared to an OBD-II unique cable ID database 58 to determine the particular initiation protocol used by the onboard computer 12. For more information related to determining the communications protocol based on a second cable connector 36, please refer U.S. Patent Application Publication No. US 2005/0182535 entitled, Device and Method For Identifying A Specific Communication Protocol Used In An On-Board Diagnostic Tool, assigned to Innova Electronics Corporation of Fountain Valley, Calif., the entire contents of which are incorporated herein by reference. Once the basic communication protocol is determined, the tool 10 may request the VIN from the computer 12.

Standard, or basic communication protocols may allow the user to obtain standard, or low level diagnostic data. For instance, certain rules and regulations may require that data related to emissions and mileage per gallon be obtainable using a basic communication protocol. In order to obtain higher level, or more detailed diagnostic information, the diagnostic tool 10 may be required to communicate a diagnostic information request to the onboard computer 12 in one or more higher level protocols (collectively referred to herein as "diagnostic protocols"), which differ from the basic communication protocol. The diagnostic protocol may be unique to various vehicle characteristics, such as the particular year, make, model, engine, computer, etc. of the vehicle.

It is contemplated that the vehicle's computer system may employ a plurality of diagnostic protocols to control communication related to the various components and functions associated with the vehicle. The various diagnostic protocols may be organized in a hierarchical structure which may correlate to the sensitivity of the vehicle data associated with the protocol.

In one embodiment, the diagnostic protocols may include system level protocols which provide access and possible control to data associated with a particular vehicle system. For instance, the vehicle may include a system level protocol for accessing data related to the braking system. Such a braking system level protocol may provide access to general braking system data, such as whether the brakes are working or not.

More specific system-level data may be controlled by intra-system protocols. A given system may include several intra-system protocols controlling access to its data. Each intra-system protocol may control access to certain parts of the system. For instance, in the case of the braking system described above, the vehicle may include a brake on each wheel. Access to sensor data related to each brake may be controlled by an intra-system protocol.

It is also contemplated that various diagnostic protocols may control read/write access to the corresponding vehicle data. More specifically, certain diagnostic protocols may only allowing viewing of the vehicle data (i.e. "read diagnostic protocols"), whereas other protocols may allowing writing or altering the vehicle data (i.e., "write diagnostic protocols").

The private or diagnostic communication protocols may be determined by decoding the vehicle information, such as the VIN number of the particular vehicle. The VIN number contains information relating to the year, make, model, engine, and other characteristics of that particular vehicle. Therefore, once the VIN number is obtained from the vehicle, the protocols required to obtain higher level information may be determined.

The diagnostic tool 10 includes a VIN protocol sequencer 60 for decoding the VIN number of the vehicle. In this manner, the VIN protocol sequencer 60 obtains the vehicle specific information (year, make, model, etc.) from the VIN number. The VIN protocol sequencer 60 is in communication with a diagnostic protocol database 62 having a plurality of diagnostic protocols correlating to vehicle specific information. The diagnostic protocol database 62 illustrated in FIG. 3 includes a first diagnostic protocol 64, a second diagnostic protocol 66, a third diagnostic protocol 68 and an Nth diagnostic protocol 70. Once the vehicle specific data obtained from the VIN number is correlated to a diagnostic protocol, higher level diagnostic information may be obtained from the onboard computer 12.

The diagnostic protocol database 62 may be constructed by obtaining diagnostic protocols from individual vehicle manufacturers which correlate to particular vehicle-specific data. It is understood that the vehicle manufacturers may license such information to third parties. Therefore, the VIN protocol sequencer 60 may determine if the user has obtained a license, or other permission from the vehicle manufacturers to use a particular diagnostic protocol to access the desired higher level diagnostic data. If the required license has been obtained, the database will likely include the diagnostic protocol. If the particular protocol needed is not located on the database, the diagnostic tool may provide the user with various options.

The diagnostic tool 10 may have the required protocol stored locally on the tool 10, or in a remote location accessible by the tool 10. A pop-up window on the tool's display may provide the user the option of purchasing/licensing the protocol when needed. In another embodiment, the diagnostic tool 10 may be capable of communicating with a remote database which includes the desired protocol. For instance, a vehicle manufacturer may have an on-line website which may be accessed via the diagnostic tool 10 to download the required protocol.

The diagnostic tool 10 may provide access to a database having a list of vehicle repair/diagnostic facilities which have licensed the desired protocol. The diagnostic tool 10 may match the desired protocol with the facilities that have licensed the particular protocol and provide a list of facilities to the user.

Once the higher level diagnostic data is received from the onboard computer 12 the diagnostic tool 10 may process the data and communicate the diagnosis to the user. One embodiment of the diagnostic tool 10 includes a display 26 and diagnostic indicators 28, such as emissions indicators, in electrical communication with the CPU 38. The tool 10 may additionally include a data logger 65 to allow the tool 10 to log data received from the computer 12. Furthermore, the tool 10 may also include a power source 67 for supplying power to the tool 10.

Figure 4:
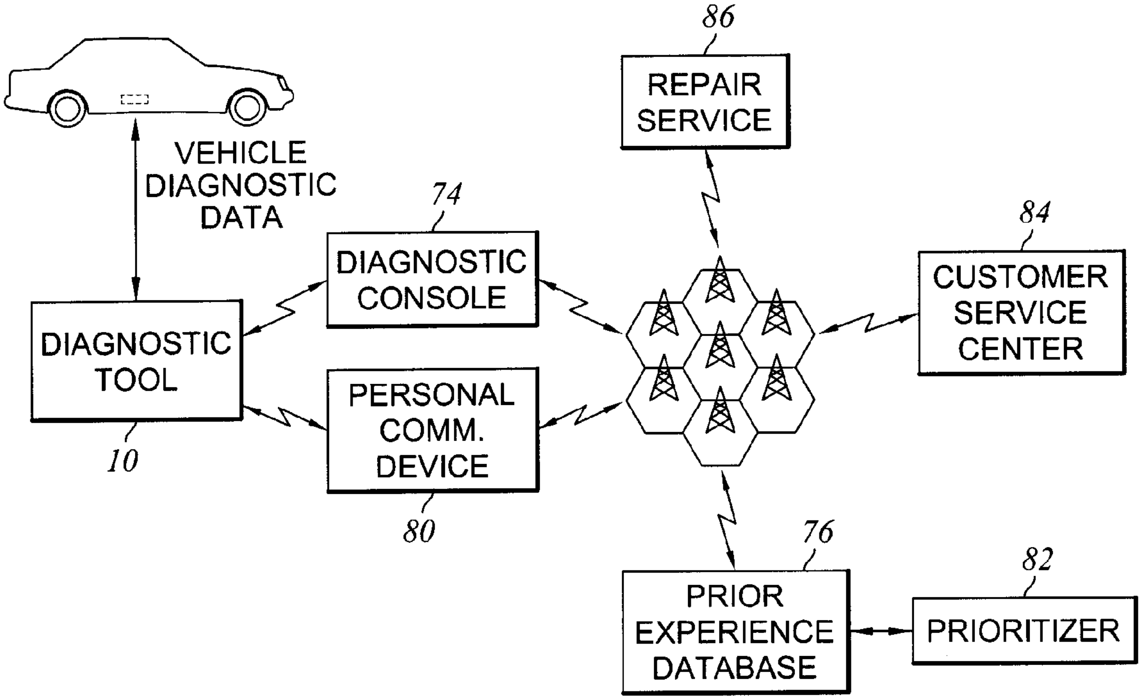
FIG. 4 is a block diagram of a diagnostic system including the automotive diagnostic tool.

Referring now to FIG. 4, there is shown a diagnostic system including the automotive diagnostic tool 10. Although the diagnostic tool 10 may be capable of performing a basic diagnosis, it may be desirable to communicate the obtained diagnostic data to a remote location (remote from the diagnostic tool 10) for a more detailed diagnosis. For instance, the tool 10 may connected to a diagnostic kiosk or console 74, which may be located at a convenience store, car dealership, vehicle repair shop or other locations. For more information on the use of a diagnostic kiosk or console 74 in connection with the diagnostic tool 10, please refer to U.S. Pat. No. 7,376,497 entitled Use of Automotive Diagnostics Console to Diagnose Vehicle, and U.S. Patent Application Publication No. 2005/0182535 entitled Device and Method For Identifying a Specific Communication Protocol Used in an On-Board Diagnostic Tool, assigned to the common assignee of this application, Innova Electronics Corporation of Fountain Valley, Calif., the entire contents of which are incorporated herein by reference.

The diagnostic tool 10 may include a kiosk connector 22 (see FIG. 3) in communication with the CPU 38. The kiosk connector 22 facilitates communication between the diagnostic tool 10 and a diagnostic console 74 to allow diagnostic data to be uploaded from the tool 10 to the console 74. Communication between the diagnostic tool 10 and the console 74 may be achieved through wireless communication or wired communication. The diagnostic console 74 may be able to perform a diagnosis based on the information received from the tool 10.

However, given the complex nature of today's vehicles, identifying a particular diagnostic failure source tends to be difficult. Therefore, the diagnostic data may be communicated to more specialized diagnostic locations capable of analyzing the data and outputting a diagnosis. One embodiment, the tool 10 communicates data to a remote prior experience database 76. The prior experience database 76 includes information related to diagnostic solutions associated with combinations of diagnostic data. The prior experience database 76 is arranged to match the received vehicle diagnostic data to possible diagnostic solutions. It is contemplated that the automotive diagnostic tool 10 may communicate the vehicle diagnostic data to the prior experience database 76 via a cellular telephone network 78, either directly via a diagnostic transceiver 72 (see FIG. 3), by way of a personal communication device 80, or via the console 74.

The prior experience database 76 may include a prioritizer 82 connected thereto to prioritize the possible diagnostic solutions. The possible diagnostic solutions may be prioritized in accordance with ranked matches of the received diagnostic data to the previous combinations of diagnostic data stored in the prior experience database 76. The possible diagnostic solution associated with the highest ranked combination of diagnostic data is identified as the most likely solution. The most likely solution may be wirelessly communicated the user via the user's personal communication device 80 or the console 74, or directly to the tool 10 to alert the user of the likely diagnosis. For a more detailed description of prioritizing the possible diagnostic solutions generated from the prior experience database, please see U.S. patent application Ser. No. 11/823,757 entitled Automotive Diagnostic and Remedial Process, assigned to Innova Electronic Corporation of Fountain Valley, Calif., the contents of which are expressly incorporated herein by reference.

After the most likely solution is identified, the vehicle components associated with the most likely solution are identified by a vehicle component identifier. This may be performed by using a lookup table to associate the most likely solution with the identified vehicle components.

Once the vehicle components are identified, the automotive diagnostic tool 10 is configured to log diagnostic data related to the vehicle components. More specifically, a signal containing the most likely failure source is communicated from the prior experience database 76 to the automotive diagnostic tool 10. Upon receipt of the signal, the tool 10 is configured to log diagnostic data related to the vehicle components. In this manner, the data logging capability of the automotive diagnostic tool 10 is focused on the systems or components that are associated with the most likely solution in order to verify the source of the problem. If the tool 10 includes the protocols required to retrieve data from the systems or components associated with the most likely solution, the tool 10 may begin retrieving data therefrom. However, if the tool 10 does not include the required protocols, the tool 10 may present the user with the option to purchase/license the protocols, or direct the user to a repair facility which has licensed the protocol (as described above).

The tool 10 may include a data logger for logging data from the onboard diagnostic computer 12. As such, the onboard diagnostic computer 12 may be capable of obtaining operational data associated with each component or system connected thereto. The automotive diagnostic tool 10 may be configured to log such data in response to the vehicle components associated with the most likely solution being identified. As such, the automotive diagnostic tool 10 may send a signal to the onboard diagnostic computer 12 requesting such data. A user may be able to program the tool 10 to log data for a selectable period of time.

The diagnostic data received from the onboard diagnostic computer 12 may be useful to determine whether the identified most likely failure source is in fact the actual source of failure. If the diagnostic data does not show some irregularity or other signs of a problem, the identified most likely failure source may not be the actual failure source. In this event, the automotive diagnostic tool 10 may be reconfigured to log diagnostic data related to the components associated with a second most likely failure source. This process may be repeated until the logged data confirms that the identified likely failure source is the actual source of the failure.

After a diagnosis has been completed, a customer service center 84 and/or repair center 86 may be automatically contacted to schedule service or repair. The console 74, personal communication device 80, or the tool 10 may communicate the diagnosis to the customer service center 84 and/or the repair center 86 via the telephone network 78.

Method of Receiving Diagnostic Information

Figure 5:
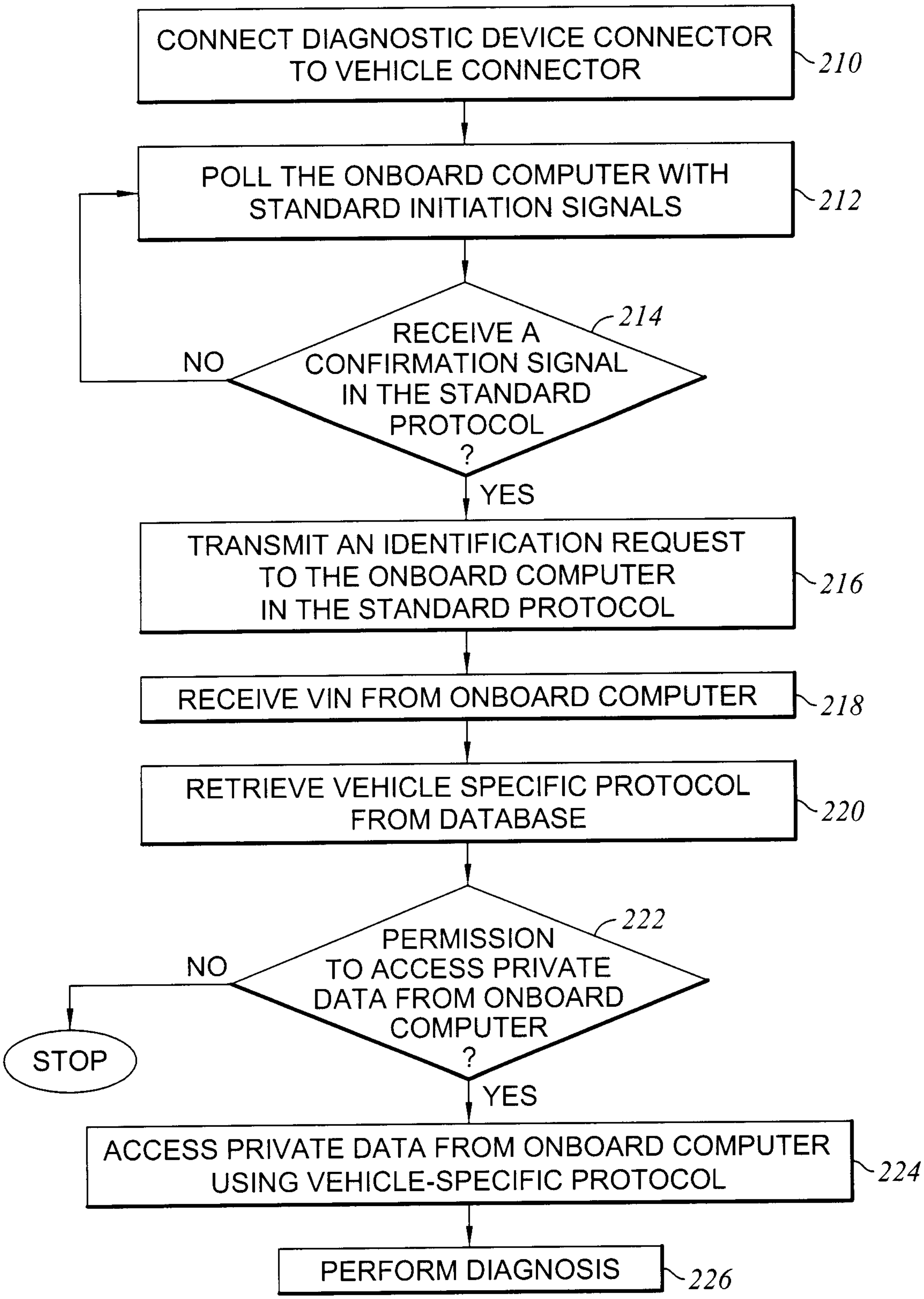
FIG. 5 is a flow-chart of a process of decoding vehicle identification information to determine a diagnostic protocol.

In addition to the foregoing, it is expressly contemplated that one aspect of the invention includes a method of receiving diagnostic information from an onboard computer 12. Referring now to FIG. 5, there is illustrated a flow chart including various steps performed in one embodiment of the method. In step 210, the diagnostic device connector 20 is connected to the vehicle connector 30. As described above, the diagnostic device connector 20 may physically engage the vehicle connector 30, or an intermediate adaptor, such as a cable 32 may be disposed therebetween. Furthermore, the diagnostic device connector 20 may also be configured to wirelessly communicate with the vehicle connector 30.

In step 212, the diagnostic tool 10 polls the onboard computer 12 with standard initiation signals to determine the basic communication protocol. In one implementation, the onboard computer 12 is serially polled with the initiation signals (one at a time), while in another implementation, the diagnostic tool 10 polls the onboard computer 12 with the standard initiation signals in parallel (all at once).

In step 214, the diagnostic tool 10 determines whether a confirmation signal is received in the basic communication protocol. If not, the diagnostic tool 10 continues to poll the onboard computer 12 with standard initiation signals and different basic communication protocols. Conversely, if a confirmation signal is received in the basic communication protocol the diagnostic tool 10 proceeds to step 216.

In step 216, with the basic communication protocol determined, the diagnostic tool 10 transmits an identification request to the onboard computer 12 in the basic communication protocol. The identification request may request the VIN number from the onboard computer 12, or other vehicle-specific information from the onboard computer 12.

In step 218, the VIN, or other vehicle-specific information is received from the onboard computer 12.

In step 220, the diagnostic protocol is retrieved from the vehicle-specific database 62. In this manner, the VIN number, or other vehicle-specific information is decoded and is correlated with a particular diagnostic protocol.

In step 222, the diagnostic tool 10 determines whether it has permission to access private data or higher level diagnostic information from the onboard computer 12. For instance, the diagnostic tool 10 may determine if it has a license, or other permission from the manufacturer to access the information. If the tool 10 does not have permission to access the information, the process may stop. At this point, the user may determine whether it is desirable to obtain the necessary permission to access the higher level diagnostic data. Otherwise, the user will be denied access t the diagnostic information. If the diagnostic tool determines that it does has permission to access the private data from the onboard computer 12, the tool 10 proceeds to step 224 wherein the private data is accessed from the onboard computer 12 using the diagnostic protocol. Once the private data is accessed a diagnosis may be performed (as described in more detail above) in step 226.

Communication of Diagnostic Data

It is also contemplated that, various aspects of the present invention are directed toward utilizing the evolving capacity of cellular telephones to support voice and data information, and to avoid the need for installing dedicated wireless devices to communicate between the diagnostic system and a cellular network, or other dedicated radio frequency systems. Such contemporary cell phones incorporate a user visual interface, a series of input keys, an internal processor, internal storage, and communications links adapted for bidirectional communication of voice, data and control signals, sufficient to access and communicate diagnostic information and related control signals.

In one embodiment of the invention diagnostic information and/or control signals are communicated between the cell phone network and the vehicle on-board computer via a first-stage, local connectivity network, such as a Bluetooth™, Wi-Fi network or infrared communication signals. The link between the local connectivity network and the vehicle computer may be implemented using the tool 10 modified to incorporate a local connectivity communication circuit. The link between the local connectivity network and the cellular network may be implemented using a cell phone or personal data assistant incorporating a Bluetooth™, Wi-Fi or infrared connectivity circuit.

Where the tool 10 is not engaged in communication with a local connectivity network (e.g. not located proximate a Bluetooth™ enabled cell phone), the tool 10 may store the diagnostic data for review or be used to manually transport data from the vehicle to be uploaded to a remote personal computer (e.g. by USB connector or personal computer supported local connectivity network) for communication with a remote service provider. The tool local connectivity circuit may, therefore, be in communication with a personal computer local connectivity circuit. As such, diagnostic information may alternately be communicated from the tool 10 to a personal computer, for further communication to remote service providers, without use of the cellular network.

In some embodiments the tool 10 may communicate with other devices, such as a personal data assistant or Blackberry™, (collectively a “personal data assistant”) adapted for communication with a local connectivity circuit and/or the cellular telephone network. In further embodiments, the tool 10 may itself incorporate a cellular network connectivity circuit for communicating directly between the tool 10 and the cellular telephone network.

In further embodiments the cell phone and/or tool 10 may incorporate GPS circuitry to provide location information that may be communicated to a remote service provider along with diagnostic information, via the cellular telephone network and/or manual transport and uploading to a personal computer. In another implementation, a tool adapter is provided for interfacing a conventional tool to a local connectivity network for communicating information accessed by the conventional tool to a cell phone or personal computer.

Figure 6:
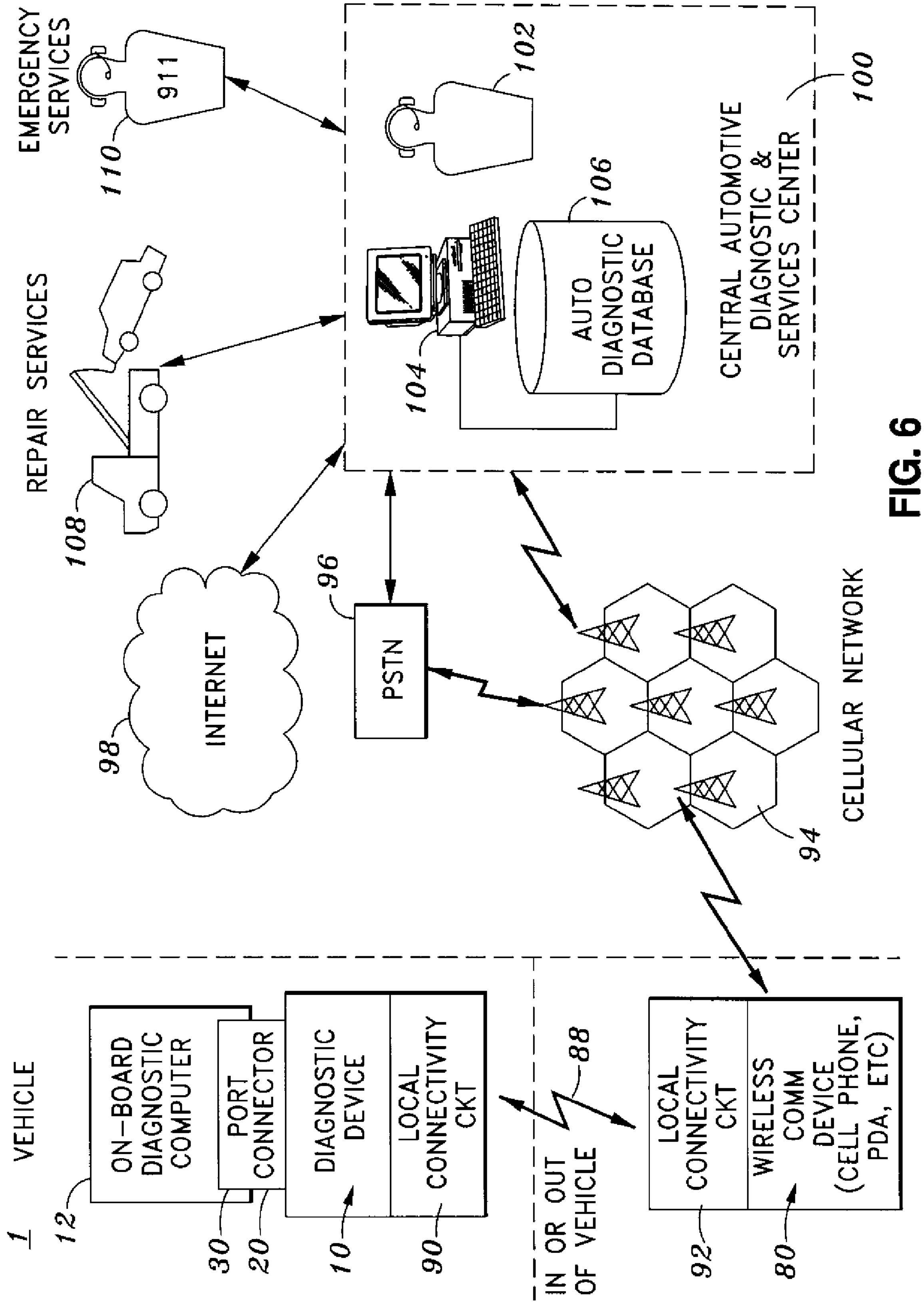
FIG. 6 is a block diagram of a diagnostic and communication system for retrieving diagnostic data and communicating the data to a central database via a cell phone.

Turning now to the drawings, FIG. 6 illustrates basic structure and function of one implementation of the present invention. In the implementation shown therein, vehicle 1 incorporates an onboard diagnostic computer 12 having a vehicle diagnostic port 30. Scan tool 10, includes a diagnostic port connector 20 engagable to diagnostic port 30 to access diagnostic information from the vehicle onboard diagnostic computer 12. In other embodiments, the connecting cable 19 is provided to connect the diagnostic device 10 to the vehicle onboard computer 12.

The scan tool 10 may be provided with a local connectivity circuit 90, to facilitate communication of diagnostic information and control signals between the diagnostic tool 10 and a local connectivity network 88 for communication between the diagnostic tool 10 and wireless communication device 80. The wireless communication device 80 may be implemented as a cell phone, PDA, Blackberry or other similar devices. The wireless communication device 80 also incorporates a local connectivity circuit 92, which allows local communication between the diagnostic device 10 and the wireless communication device 80. As indicated above, the local connectivity circuit may be implemented using Bluetooth™, Wi-Fi, infrared or other local connectivity networks utilizing signal protocols commonly used for such network.

The wireless communication device 80 is, in turn, in communication with a cellular telephone network 94. The cellular telephone network 94 is, in turn, in communication with Public Switched Telephone Network (PSTN) 96 and/or the Central Automotive Diagnostic and Services Center 100.

The central automotive diagnostic and services center 100 includes a computer terminal 104 and interconnected automotive diagnostic database 106. The operator or human interface 102, may thereby receive information from the wireless communication device 10, such as diagnostic trouble codes, which can be correlated into the corresponding diagnostic condition, using automotive diagnostic database 106. The operator or human interface 102 may take steps appropriate to the diagnostic condition, by communicating with repair services 108, emergency services 110, or to other parts or services providers, via internet 98, or by communicating with the user, via the cellular network 94.

According to one embodiment, the automotive diagnostic and services center 100 may coordinate repair services 108, emergency services 110, or other similar repair and diagnostic services within a specific geographical area. In particular, different geographical parameters may be used to locate services providers which are in a location which is convenient for the user. Service provider may pay a fee to be included on a database used by the diagnostic and services center 100.

It is contemplated that each wireless communication device 80 may be associated with one or more physical addresses (i.e., home address, work address, etc.). The addresses may be provided during initial registration with the central automotive diagnostic and services center 100. The addresses may also be updated by the user at any time. The automotive and diagnostic services center 100 may search for service providers within a certain range of the physical address(es). For instance, service provides within a set radius (i.e., 5 miles, 10 miles, etc.) of the user's work address and/or home address may be searched for. Alternatively, service providers located within the same town, zip code, county, etc. may be searched for. Other geographical parameters known by those skilled in the art may also be employed without departing from the spirit and scope of the present invention.

It is also contemplated that the central automotive diagnostic and services center 100 may use GPS data to search for service providers. In this regard, the wireless communication device 80 and/or the diagnostic tool 10 may include a GPS device 112 for generating positioning data which may be used to find service providers.

Upon locating service providers, the central automotive diagnostic and services center 100 may request a bid from each service provider to perform one or more services. In this regard, diagnostic information may be transmitted from the diagnostic and services center 100 to the service providers to allow the service providers to formulate a bid. The bid(s) may be communicated directly to the user's wireless communication device 80, or the bid(s) may be routed through the diagnostic and services center 100.

Figure 7:
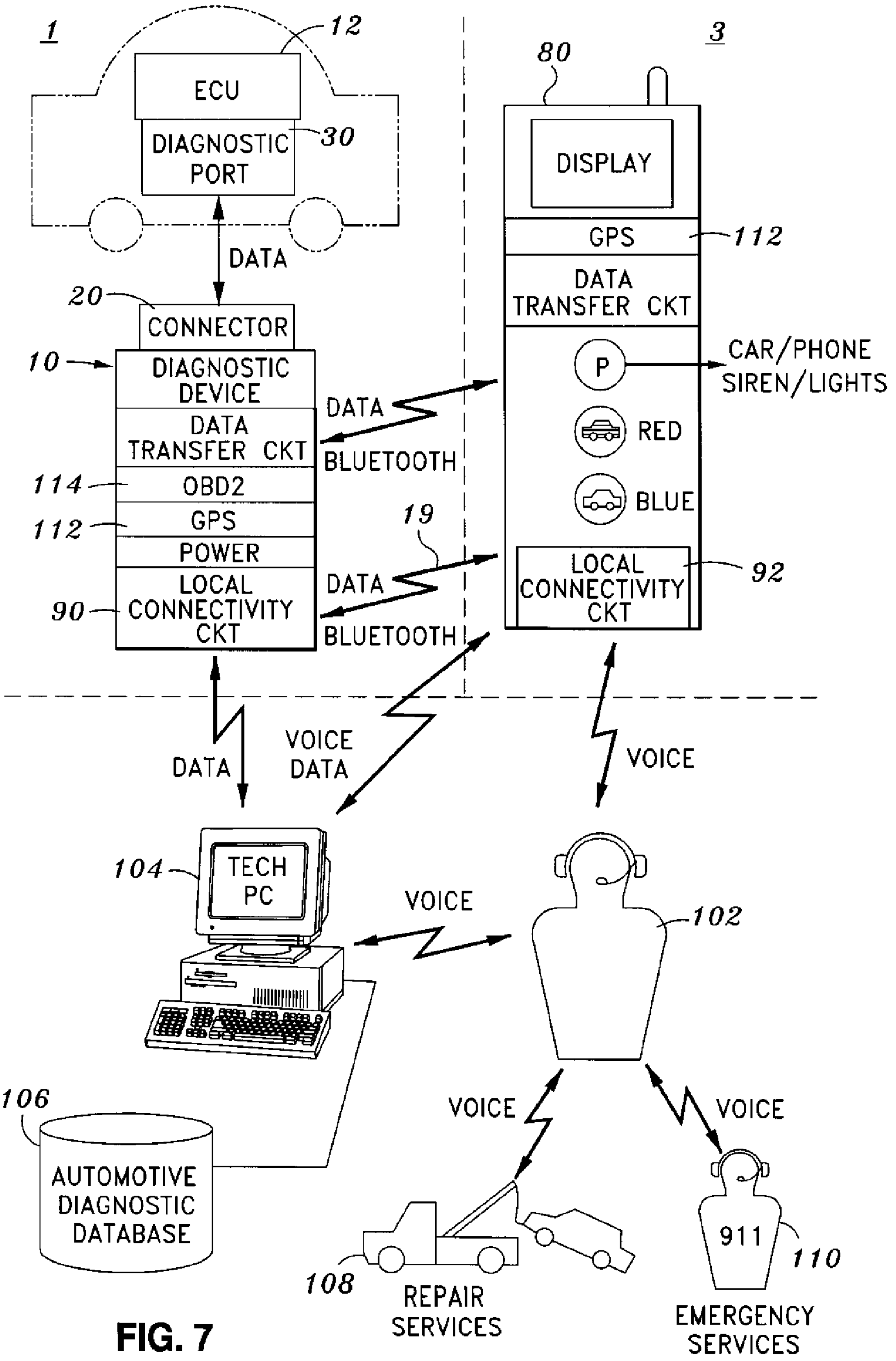
FIG. 7 is a block diagram depicting another embodiment of the diagnostic and communication system.
Figure 8:
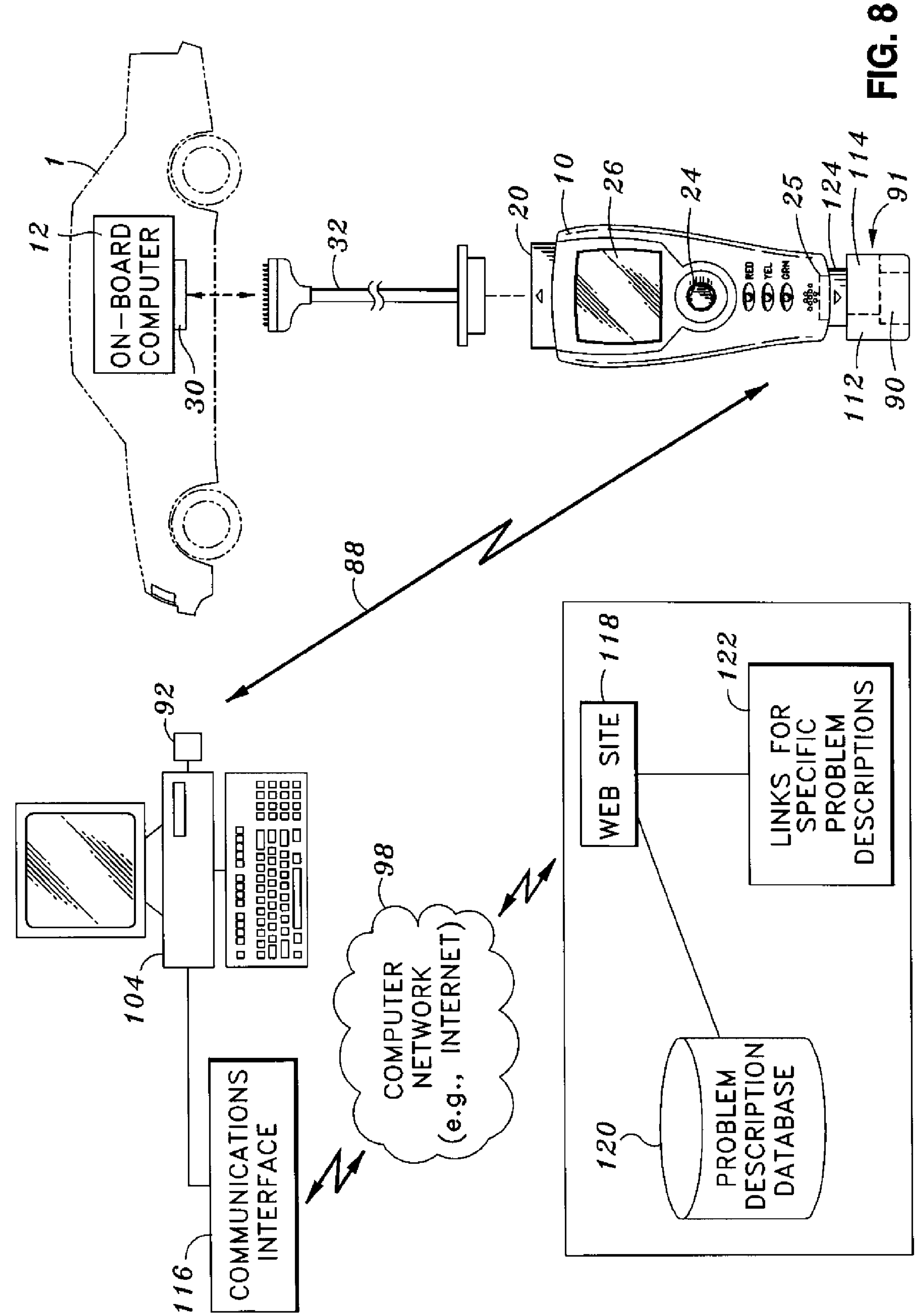
FIG. 8 is a block diagram illustrating additional embodiments of the diagnostic and communication system.

FIG. 7 illustrates additional functionality of the present invention in connection with the illustrated embodiment. As shown therein, vehicle 1 again incorporates an onboard diagnostic computer 12 and diagnostic port 30. The diagnostic tool 10 is in direct electrical connection with the diagnostic port 30, and may be supported thereby. In alternate embodiments the tool 10 may be connected to port 30 via cable 32, as shown at FIG. 8.

When the present invention is implemented using a scan tool 10 not having local wireless transmission capabilities, an adapter may be provided to provide connectivity to communicate with the local connectivity network. As shown in FIG. 8, adapter 91 is engaged to tool 10, such as by connector 124 engaged to device port 25. Port 25 may be implemented as a USB connector port plug engagable to the adapter 91, or to a USB port of a personal computer. Adapter 91 includes a local connectivity circuit 90, for data communication with the wireless communication device 80 and/or the computer terminal 104. The adapter 91 may further include a GPS circuit 112 and an OBD II protocol circuit 114.

Most commonly the wireless device 80 may be implemented as a generally conventional cell phone, with functionality for communicating with the scan tool 10 or adapter 91, where the adapter 91 is implemented separate from the scan tool 10. Wireless device 80 may incorporate a local connectivity circuit 92, for communicating with the diagnostic device local connectivity circuit 90. The cell phone 80 therefore can communicate data, such as diagnostic information and control signals between the scan tool 10 and the cellular telephone network. As such, the onboard computer 12 may be queried, or operating parameters adjusted, as appropriate to access diagnostic information, or change operating conditions within the vehicle.

In one embodiment of the invention as shown in FIG. 7, the cell phone 80, is provided with dedicated function lights, and associated function circuitry, to facilitate communication of diagnostic information. Blue indicator is operative to provide a data ready signal to indicate receipt of diagnostic trouble codes from the diagnostic device local connectivity circuit 90. The blue indicator may also function to initiate a communications link, using the cellular communication network, to communicate with the Central Automotive Diagnostic and Services Center 100 (FIG. 6) or such other telephone number as may be desired by the user.

In one embodiment of the invention pressing the blue indicator may automatically link the cell phone 80 to a preset telephone number. In another embodiment of the invention, depression of the blue button will generate options on the cell phone display, which may be selected by use of the cell phone keyboard. One such option may include manual entry of desired telephone number on the keypad.

Illumination of the red indicator may serve to indicate presence of one or more predetermined trouble codes, or other diagnostic information indicative of a more immediate need for attention. Again, in different embodiments of the invention the red indicator may function as an input button, which may be depressed to initiate a communications link with scan tool 10, e.g. generate an interrogation signal for communication to the scan tool 10.

As shown in FIG. 7, the cell phone 80 may further include a GPS circuit 112, as is included in some contemporary cell phones. The GPS information may be encoded and communicated from the cell phone 80 to a remote service provider. Alternatively, as described above, GPS circuitry 112 may be included within scan tool 10.

The scan tool 10 may be provided with an output connector 25 (FIG. 8), which may be a USB output port that is engagable to connector 124 of local connectivity adapter 91. Diagnostic information from the onboard computer 30 may therefore be communicated to the scan tool 10, and thereafter communicated to a local connectivity circuit for communication to a wireless device 80 or computer terminal 104. Alternatively, the scan tool 10 connector port 25 may be directly connected to computer terminal 104, e.g. though a USB port, to allow downloading of diagnostic information received from the vehicle onboard computer 30 and stored in the diagnostic device 10. The computer terminal 104 may in turn be connected to the computer network 16, via communications interface 116. The computer network 16 allows the computer terminal 104 to be connected to website 118 which may be linked to a problem description database 120 and/or links for specific problem descriptions 122.

In practice, the scan tool 10 may thereby allow either real time or delayed communication of diagnostic information from the vehicle onboard computer 30 to one or more remote locations, wherein vehicle diagnostic information may be analyzed and corrective actions identified. Information respecting parts and services useful for such corrective actions may be communicated to the user and displayed on the diagnostic display 26 or cell phone display. Selection of various functions may be implemented using input buttons on the scan tool 10 or cell phone, e.g. keypad, as may be appropriate for different diagnostic conditions.

Figure 9:
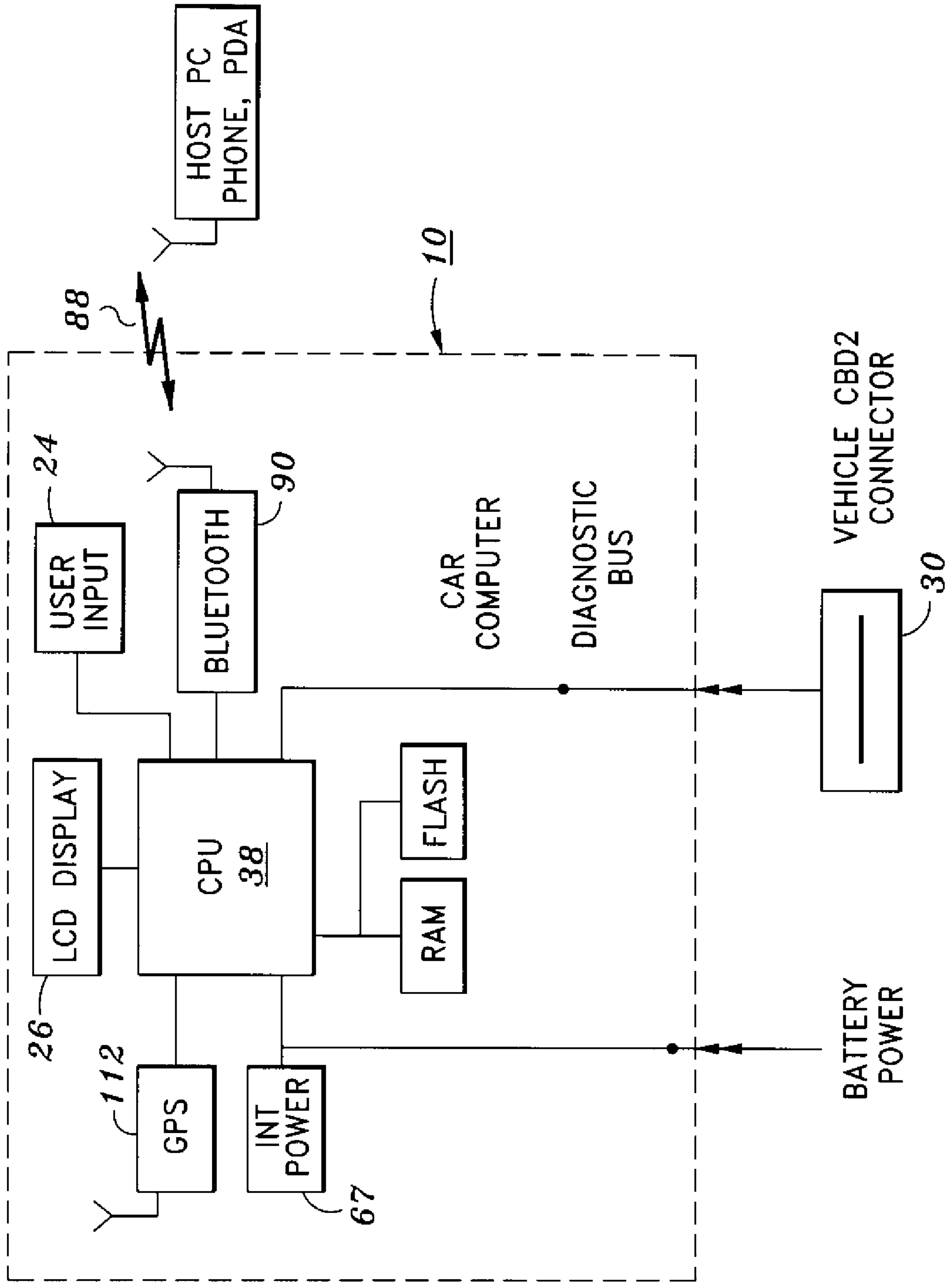
FIG. 9 is a block diagram of a scan tool constructed in accordance with one implementation of the invention.

FIG. 9 illustrates a basic functional diagram of representative of the operation of tool 10, in one implementation. As shown therein, the tool 10 is adapted for bidirectional communication with a vehicle diagnostic port 30, a local connectivity circuit, and a USB connector (or the like) for a host PC. As shown therein, the tool 10 may include a GPS circuit 112, user inputs 24, (such as keypads or connect buttons) and one or more LCD displays 26.

Figure 10:
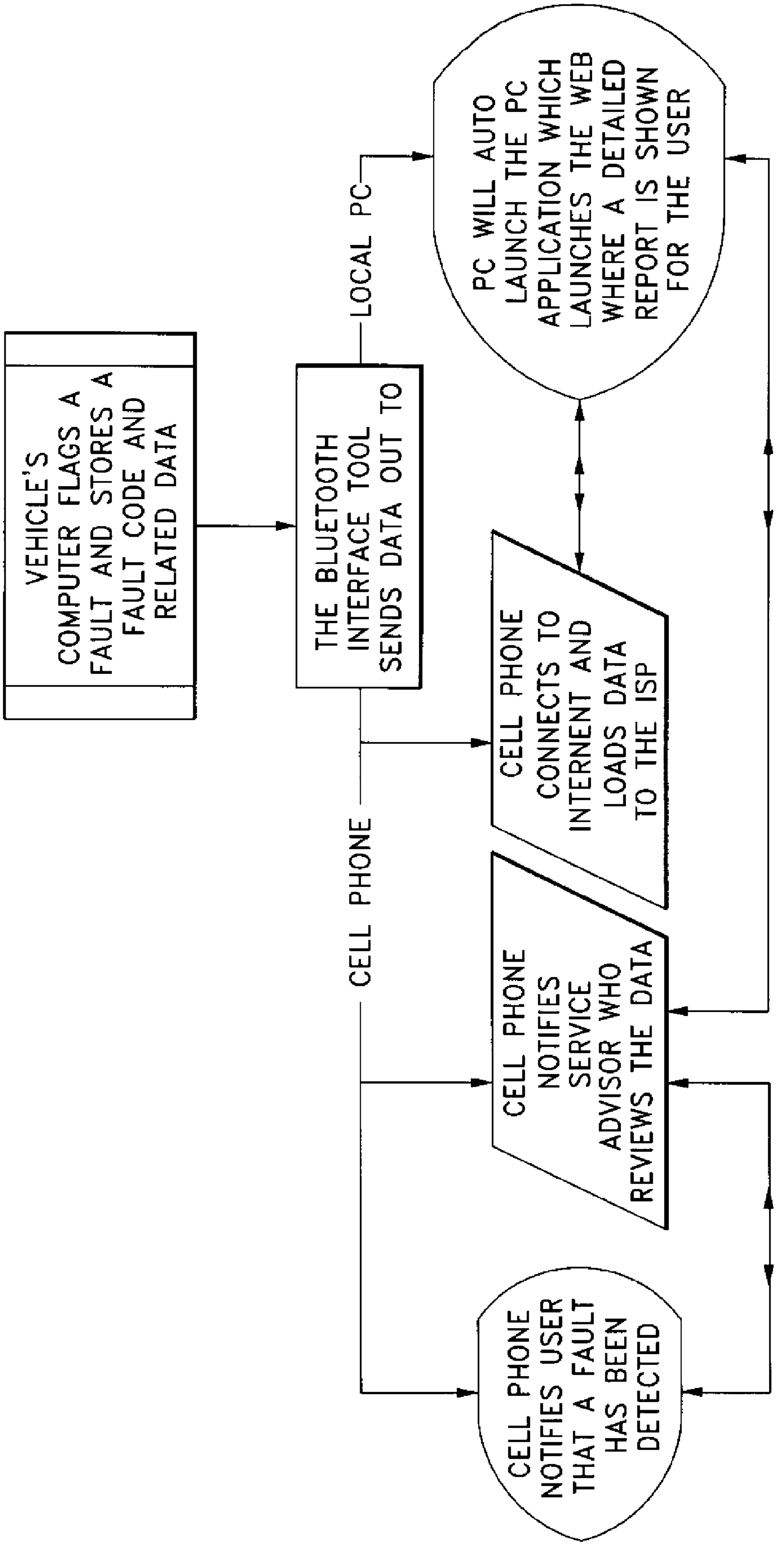
FIG. 10 is a flow chart illustrating the sequence of functions in accordance with one implementation of the invention.

FIG. 10 is a flow chart representing certain operations that may be effected in accordance with one implementation of the present invention. As the process shown therein is initiated when the vehicle flags a fault, and stores a fault code and related vehicle diagnostic data. That information is communicated to a diagnostic device, having a local connectivity circuit formed therein, or formed in an adapter connected to the scan tool. As indicated above, the scan tool may generate visual or audible signals indicating the receipt of the fault codes, and display associated descriptors. The local connectivity circuit can communicate the fault code and related data to nearby equipment having compatible local connectivity circuits, such as Bluetooth equipped cell phone or local computer terminal. Where the fault codes and related data are received by the cell phone, the cell phone may provide the user with information that a fault has been detected, such as by illuminating a dedicated indicator on the cell phone, or by generating an audible signal, or by providing text data on the cell phone display. The cell phone may further proceed to notify a service adviser that fault codes and related data have been received. Such notification may proceed autonomously by programming within the cell phone, or may require the cell phone user to initiate a communication with the service advisor, either by depressing a dedicated button, navigating a cell phone user visual interface, or by entering a desired telephone number.

The cell phone may communicate data, over the cellular telephone network, to a service advisor either by direct cell phone link, by connection to a landline via public switched telephone network, or by connection to internet portal, whereby data is communicated via the internet to an internet service provider.

Where the diagnostic device local connectivity circuit is in communication with a local personal computer, the personal computer may implement connectivity with internet service providers, landline telephones or other systems to provide analysis of the fault codes and related data, as well as any data control signals necessary to obtain additional information from the vehicle onboard computer, or to adjust the operation thereof. Voice communication may also be implemented between the service provider receiving the fault codes and related data, and the user's cell phone, to provide additional information, such as the location of a nearby service facility, emergency service communications, towing services, etc.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of diagnosing a vehicle having an onboard computer and a vehicle identification number, the onboard computer configured to transmit the vehicle identification number in response to receipt of an identification request transmitted in a first protocol, the onboard computer including diagnostic data being retrievable in response to receipt of a diagnostic request in a second protocol, the method comprising the steps of:

a. connecting a diagnostic device to the onboard computer;

b. retrieving the vehicle identification number from the onboard computer using the first protocol;

c. matching the vehicle identification number with a second protocol database independent of user intervention, the second protocol database stored locally on the diagnostic device and including one or more second protocols, to determine a specific second protocol of the one or more second protocol(s) being useful for retrieving diagnostic data associated with a particular vehicle system;

d. configuring the diagnostic device to communicate in the specific second protocol;

e. transmitting a diagnostic request in the specific second protocol from the diagnostic device to the onboard computer;

f. receiving diagnostic data associated with the particular vehicle system via the onboard computer;

g. transmitting the diagnostic data from the diagnostic device to a cell phone via a local connectivity network; and h. transmitting the diagnostic data from the cell phone to a main server via a cellular telephone network, the main server having a diagnostic database being arranged to map vehicle diagnostic data to a possible vehicle fix(es), wherein the diagnostic device is configured to receive information from the onboard computer independent of the cell phone.

2. The method of claim 1 further including the step of:

i) soliciting a bid from a repair shop to perform the possible vehicle fix(es).

3. The method of claim 2, wherein the cell phone includes a destination address, the main server having a work address associated with the cell phone destination address, wherein step (i) includes soliciting the bid from a repair shop within a search area based on the work address.

4. The method of claim 2, wherein the cell phone includes a destination address, the main server having a home address associated with the cell phone destination address, wherein step (i) includes soliciting the bid from a repair shop within a search area based on the home address.

5. The method of claim 2, wherein the cell phone includes a GPS device configured to generate position data associated with the position of the cell phone, wherein step (h) further includes transmitting the position data from the cell phone to the main server, and wherein step (i) includes soliciting the bid from a repair shop within a search area based on the position data.

6. The method of claim 2 further comprising the steps of:
receiving bids from a plurality of repair shops;
comparing the bids from the plurality of repair shops; and
selecting one of the bids.

7. The method of claim 2 further comprising the step of receiving the bid from the repair shop by routing the bid from the repair shop to the cell phone via the main server.

8. The method of claim 2, further comprising the step of receiving the bid from the repair shop to perform the possible vehicle fix(es).

9. The method of claim 1 wherein step (h) includes transmitting the diagnostic data from the cell phone to the main server automatically in response to receipt of the diagnostic data by the cell phone.

10. The method of claim 1 wherein step (g) includes storing the diagnostic data in the cell phone, and wherein step (h) includes transmitting the diagnostic data from the cell phone to the main server in response to input by a user.

11. The method of claim 1 wherein step (b) includes:
polling the onboard computer to identify the first protocol;
transmitting the identification request to the onboard computer in the first protocol; and
receiving the vehicle identification number from the onboard computer.

12. The method of claim 11, wherein the onboard computer is further configured to transmit private operational data in response to receipt of a private data request, the private data request being transmitted in the second protocol, wherein step (c) further includes:
accessing the second protocol database having a plurality of second protocols, each second protocol being associated with respective vehicle identification data; and
determining a specific second protocol based on the received vehicle identification data.

13. The method of claim 1, wherein steps b)-d) are performed independent of user input.

14. The method of claim 1, wherein steps b)-d) are performed independent of a user navigating a user interface.

15. The method of claim 1, wherein the second protocol is different from the first protocol.

16. The method of claim 1, further comprising the step of displaying at least a portion of the retrieved diagnostic data on the diagnostic device.

17. The method of claim 16, wherein the step of displaying at least a portion of the diagnostic data on the diagnostic device proceeds independent of any resources external to the diagnostic device.

18. The method of claim 1, further comprising the step of displaying the possible vehicle fix(es) on the diagnostic device.

19. The method of claim 1, wherein the diagnostic device is a scan tool.

20. The method of claim 1, wherein step d) includes:
retrieving the specific second protocol from the protocol database based on vehicle specific data associated with the retrieved vehicle identification number.

21. A method of diagnosing a vehicle having an onboard computer and a vehicle identification number, the onboard computer configured to transmit the vehicle identification number in response to receipt of an identification request, the identification request being transmitted in a first protocol, the onboard computer including diagnostic data being retrievable in response to receipt of a diagnostic request in a second protocol, the method comprising the steps of:

a. connecting a diagnostic device to the onboard computer;
b. retrieving the vehicle identification number from the onboard computer;
c. matching the vehicle identification number with a second protocol database independent of user intervention, the second protocol database stored locally on the diagnostic device and including one or more second protocols, to identify a specific second protocol of the one or more second protocol(s) being useful for retrieving diagnostic data associated with a particular vehicle system;
d. configuring the diagnostic device to communicate in the specific second protocol;
e. transmitting a diagnostic request in the second protocol from the diagnostic device to the onboard computer; and
f. receiving the diagnostic data associated with the particular vehicle system via the onboard computer.

22. The method of claim 21, further comprising the steps of:
transmitting the diagnostic data from the diagnostic device to a cell phone via a local connectivity network; and
transmitting the diagnostic data from the cell phone to a main server via a cellular telephone network.

23. The method of claim 21, wherein steps b)-d) are performed independent of user input.

24. The method of claim 21, wherein steps b)-d) are performed independent of a user navigating a user interface.

25. The method of claim 21, wherein steps b) and c) are performed independent of any resources external to the diagnostic device.

26. The method of claim 25, wherein the configuring step is performed after the connecting step.

27. The method of claim 21, wherein steps b)-f) are performed independent of any resources external to the diagnostic device.

28. The method of claim 21, wherein step d) includes:
retrieving the identified second protocol from the second protocol database based on vehicle specific data associated with the retrieved vehicle identification number.

29. A method of receiving data from an onboard computer located on a vehicle, the onboard computer configured to transmit vehicle identification data in response to receipt of an identification request, the identification request being transmitted in a first protocol, the onboard computer further being configured to transmit private operational data in response to receipt of a private data request, the private data request being transmitted in a second protocol, the method comprising the steps of:

a. connecting a diagnostic device to the onboard computer;
b. polling the onboard computer to identify the first protocol;
c. transmitting the identification request to the onboard computer in the first protocol;
d. receiving the vehicle identification data from the onboard computer;
e. accessing a second protocol database stored locally on the diagnostic device, the second protocol database having a plurality of second protocols, each second protocol being associated with respective vehicle identification data; and
f. selecting a specific second protocol of the plurality of second protocols based on one or more portions of the received vehicle identification data without user intervention.

30. The method as recited in claim 29 further comprising the step of determining whether the selected second protocol for a particular vehicle is stored in the second protocol database.

31. The method as recited in claim 30 further comprising the step of providing a user with the option of licensing the second protocol for the particular vehicle.

32. The method as recited in claim 29 wherein step (c) includes transmitting the identification request in response to identification of the first protocol.

33. The method as recited in claim 29 wherein the vehicle includes a barcode including vehicle identification data, the method further comprising the step of obtaining vehicle identification data by scanning the barcode on the vehicle with a barcode scanner located on the diagnostic device.

34. A method of diagnosing a vehicle having an onboard computer and a vehicle identification number, the onboard computer configured to transmit the vehicle identification number in response to receipt of an identification request, the identification request being transmitted in a basic communication protocol, the onboard computer including diagnostic data being retrievable in response to receipt of a diagnostic request in a diagnostic protocol, the method comprising the steps of:

a. connecting a diagnostic device to the onboard computer;

b. retrieving the vehicle identification number from the onboard computer;

c. matching the vehicle identification number with a second protocol database including diagnostic protocols associated with vehicle identification numbers to identify a diagnostic protocol for retrieving the diagnostic data associated with a particular vehicle system;

d. configuring the diagnostic device to communicate in the identified diagnostic protocol;

e. transmitting a diagnostic request in the identified diagnostic protocol from the diagnostic device to the onboard computer;

f. receiving the diagnostic data associated with the particular vehicle system via the onboard computer;

g. transmitting the diagnostic data from the diagnostic device to a cell phone via a local connectivity network;

h. transmitting the diagnostic data from the cell phone to a main server via a cellular telephone network, the main server having a diagnostic database being arranged to map vehicle diagnostic data to a possible vehicle fix(es);

i. soliciting a bid from a repair shop to perform the possible vehicle fix(es);

j. communicating the bid to the cell phone via the cellular telephone network;

k. prioritizing the possible vehicle fix(es) in accordance with ranked matches of the received diagnostic data to combinations of diagnostic data stored in a prior experience database, the prior experience database having an identified fix associated with each stored combination of diagnostic data, the fix associated with the highest ranked combination of operational data being identified as a most likely fix; and l. mapping the most likely fix to a vehicle repair procedure database, the most likely fix being directly mapped to an associated repair procedure.

35. The method as recited in claim 34 wherein step (k) includes comparing combinations of diagnostic data received from the onboard computer the with stored combinations of diagnostic data in the prior experience database, each stored combination of diagnostic data having an identified fix associated therewith and identifying the stored combination of diagnostic data ranked highest in relation to the diagnostic data received from the vehicle onboard computer.

36. The method as recited in claim 34 further comprising the step of determining whether the most likely fix(es) requires access to an additional diagnostic protocol.

37. A method of diagnosing a vehicle having an onboard computer and a vehicle identification number, the onboard computer configured to transmit the vehicle identification number in response to receipt of an identification request, the identification request being transmitted in a basic communication protocol, the onboard computer including diagnostic data being retrievable in response to receipt of a diagnostic request in a diagnostic protocol, the method comprising the steps of:

a. connecting a diagnostic device to the onboard computer;

b. retrieving the vehicle identification number from the onboard computer;

c. matching the vehicle identification number with a second protocol database including diagnostic protocols associated with vehicle identification numbers to identify a diagnostic protocol useful for retrieving the diagnostic data associated with a particular vehicle system;

d. configuring the diagnostic device to communicate in the identified diagnostic protocol;

e. transmitting a diagnostic request in the diagnostic protocol from the diagnostic device to the onboard computer;

f. receiving the diagnostic data associated with the particular vehicle system via the onboard computer;

g. transmitting the diagnostic data from the diagnostic device to a cell phone via a local connectivity network;

h. transmitting the diagnostic data from the cell phone to a main server via a cellular telephone network;

i. analyzing the diagnostic data to determine a possible vehicle fix(es);

j. prioritizing the possible vehicle fix(es) in accordance with ranked matches of the received diagnostic data to combinations of diagnostic data stored in a prior experience database, the prior experience database having an identified fix associated with each stored combination of diagnostic data, the fix associated with the highest ranked combination of diagnostic data being identified as a most likely fix; and k. mapping the most likely fix to a vehicle repair procedure database, the most likely fix being directly mapped to an associated repair procedure.

38. The method as recited in claim 37 wherein step (i) includes comparing combinations of diagnostic data received from the onboard computer the with stored combinations of diagnostic data in the prior experience database, each stored combination of diagnostic data having an identified fix associated therewith and identifying the stored combination of diagnostic data ranked highest in relation to the diagnostic data received from the vehicle onboard computer.

39. A method of diagnosing a vehicle having an onboard computer and a vehicle identification number, the onboard computer including diagnostic data being retrievable in response to receipt of a diagnostic request in a diagnostic protocol, the method comprising the steps of:

a. connecting a diagnostic device to the onboard computer;

b. receiving the vehicle identification number;

c. matching the vehicle identification number with a protocol database including one or more diagnostic protocols identify a specific diagnostic protocol of the one or more diagnostic protocol(s) being useful for retrieving diagnostic data associated with a particular vehicle system, the protocol database stored locally on the diagnostic device;

d. configuring the diagnostic device to communicate in the identified diagnostic protocol, the configuring step being performed after the diagnostic device is connected to the onboard computer;

e. transmitting a diagnostic request in the identified diagnostic protocol from the diagnostic device to the onboard computer;

f. receiving the diagnostic data associated with the particular vehicle system via the onboard computer;

g. transmitting the diagnostic data from the diagnostic device to a cell phone via a local connectivity network; and h. transmitting the diagnostic data from the cell phone to a main server via a cellular telephone network, the main server having a diagnostic database being arranged to map vehicle diagnostic data to a possible vehicle fix(es);

wherein the diagnostic device is configured to receive information from the onboard computer independent of any resources in the cell phone.

40. The method of claim 39, wherein step b) includes retrieving the vehicle identification number from the onboard computer.

41. The method of claim 39, wherein step d) includes:

retrieving the identified diagnostic protocol from the second protocol database based on vehicle specific data associated with the received vehicle identification number.

* * * * *